(No Model.) 2 Sheets—Sheet 2.

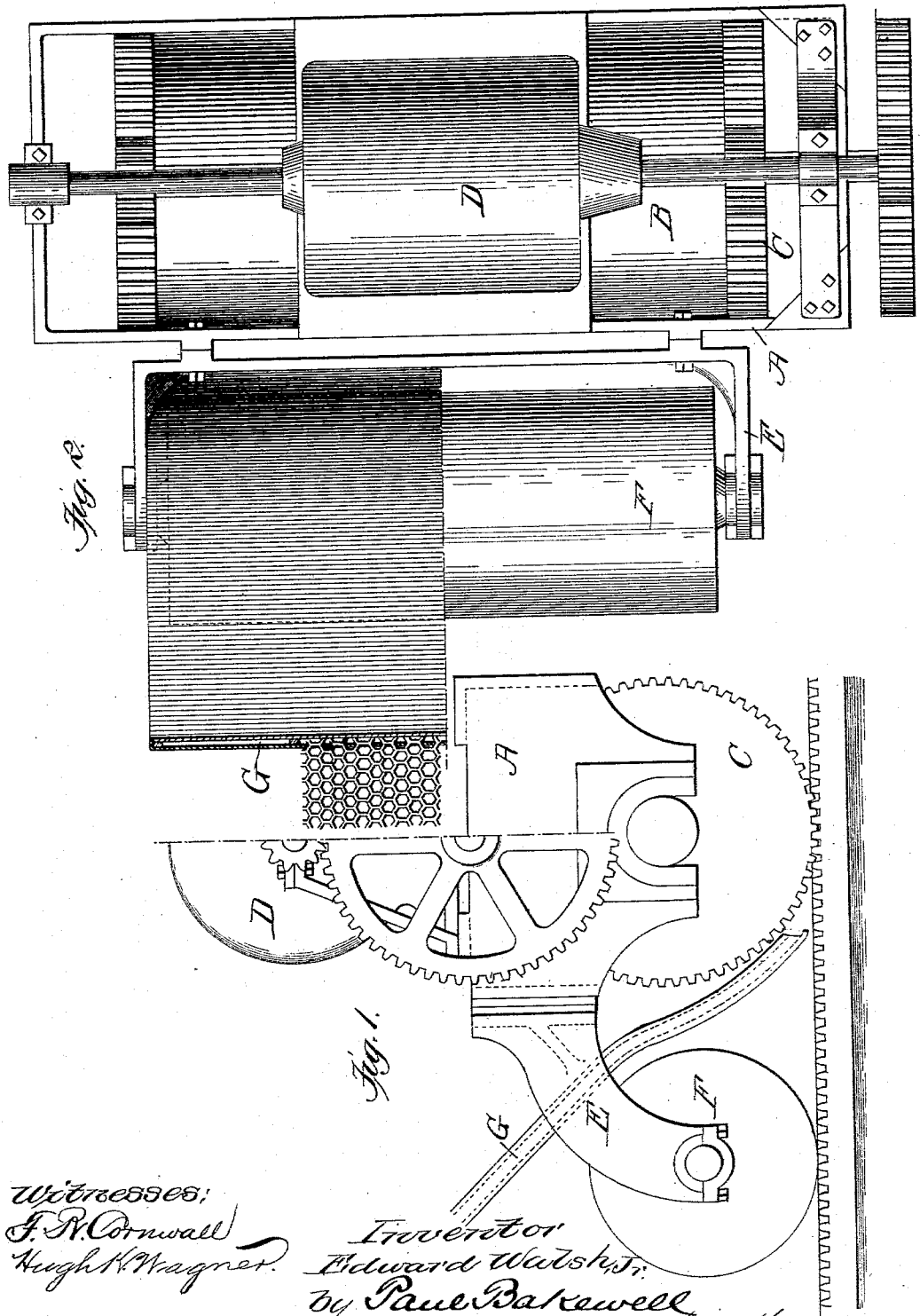

E. WALSH, Jr.
WIRED GLASS AND METHOD OF MAKING SAME.

No. 533,512. Patented Feb. 5, 1895.

Witnesses:
F. R. Cornwall
Hugh K. Wagner

Inventor
Edward Walsh Jr.,
by Paul Bakewell
his atty.

UNITED STATES PATENT OFFICE.

EDWARD WALSH, JR., OF ST. LOUIS, MISSOURI.

WIRED GLASS AND METHOD OF MAKING SAME.

SPECIFICATION forming part of Letters Patent No. 533,512, dated February 5, 1895.

Application filed October 22, 1894. Serial No. 526,580. (No model.)

*To all whom it may concern:*

Be it known that I, EDWARD WALSH, Jr., a citizen of the United States, residing at the city of St. Louis, State of Missouri, have invented a certain new and useful Improvement in Wired Glass and Method of Making the Same, of which the following is a full, clear, and exact description, reference being had to the accompanying drawings, forming a part of this specification, wherein—

Figure 3:
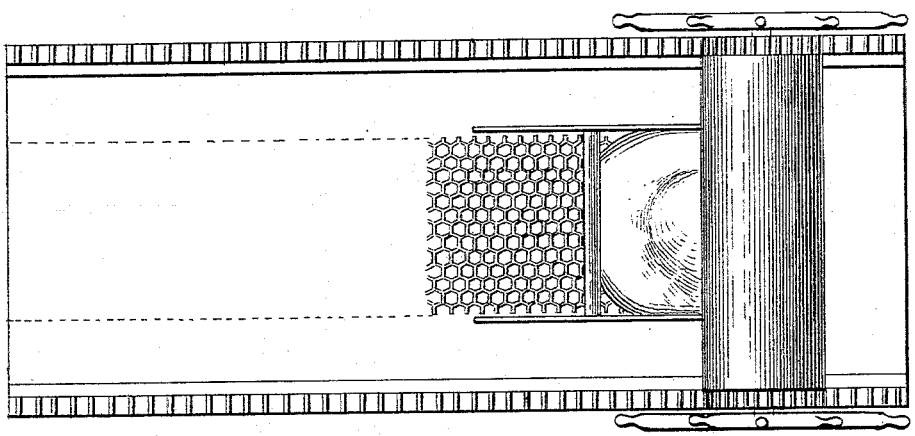
Figure 4:
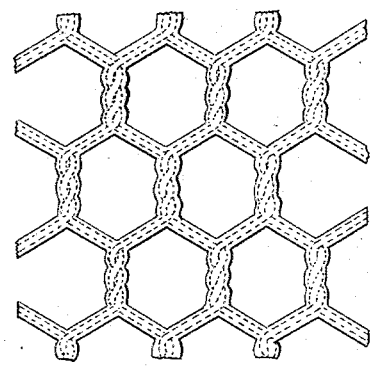
Figure 5:
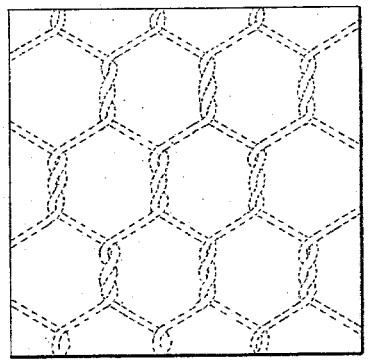

Figure 1 is a side elevation of an improved machine, which I have adopted to carry out my invention. Fig. 2 is a plan-view of said machine. Fig. 3. is a plan-view of an ordinary glass-rolling table, illustrating a slightly-different method of practicing my invention. Fig. 4 is a detail view of the prepared wire-mesh, and Fig. 5 is a detail view of the piece of plate-glass made in accordance with my invention.

This invention relates to a new and useful improvement in wired plate glass, and the method for producing the same, the essential characteristics of which may be said to reside in embedding wire-mesh in one side of the plate of glass during the process of rolling, which wire-mesh has been previously treated, so that the finished article, after being annealed, is a plate of glass in which is embedded a wire-mesh, said wire-mesh being covered by a material which has been fused with glass, the coefficiency of expansion of which material is about equal to that of the wire-mesh. A plate of glass so prepared and having the qualities described will permit the glass to expand and contract under varying temperatures without danger of cracking, the wire-mesh embedded in said plate of glass being permitted a slight play due to the elasticity of the material with which the wire-mesh was covered before being embedded in the sheet, which material has become, in the process of manufacture, homogeneous with the plate of glass.

In the drawings, A indicates the carriage in which is mounted a finishing roller B. On the axle of the roller B, are arranged driving-wheels C, which are driven by suitable gearing therebetween and a propelling motor D mounted on the carriage. This special construction forms no part of my present invention, and, therefore, I will not specifically describe the details of this glass-rolling carriage and its propelling mechanism. Mounted on the frame A of the carriage, is a bracket E, in the end of which bracket is journaled an initial roller F, which, preferably, has a smooth surface. An open-ended guide-box G for the wire-mesh is mounted upon this bracket, and terminates just in advance of the roller F.

The wire-mesh which is to be embedded in the plate of glass, as manufactured by this process, is, before being introduced into the plate of glass, treated with a coating of what is known as fusible glass, or glass which may be fused at a low temperature. This coating, as shown in Fig. 4, entirely covers the wire-mesh, but, in general, conforms to the general design of the mesh.

The coating referred to consists preferably of one hundred parts sand, twenty-seven parts limestone and twenty parts borax, which is melted into glass form. The product of this is ground finely, or pulverized, and mixed with a suitable adhesive volatile vehicle, preferably turpentine. The wire-mesh is dipped into or painted with this compound, and is ready to be embedded. I do not wish to be understood as confining myself to the ingredients composing this mixture, the proportions thereof, nor the manner of applying the same, as there are many other ingredients which can as readily be used for the purpose, without in the least departing from the nature and principle of my invention.

Practicing my invention with the machine shown in Figs. 1 and 2, the prepared wire-mesh is introduced into the box G, and, after the plate has been rolled by the advanced roller F, the wire-mesh is fed down on top of the rolled plate of glass and beneath the finishing roller B. The glass being in a semi-molten state, permits the finishing roller B, to embed the wire-mesh into the top face thereof, and where the preparation on the wire-mesh comes in contact with the hot plate of glass, it fuses and becomes homogeneous therewith, the finishing roller B, making a smooth finish on the plate. Any unevenness in the surface which might be due to the covering of the wire-mesh not fusing with the plate of glass is remedied when the plate with its attached mesh is subjected to the high annealing heat.

In Fig. 3, I have shown a slightly-different way of practicing my invention, which consists in laying the prepared wire-mesh on the table and straddling the gun over said mesh, and then rolling the semi-molten glass in the gun over the mesh. In this construction, the semi-molten glass will be pressed into the openings of the mesh, and the fusible glass on the wire-mesh will make a plain surface by being melted and running upon the smooth face of the table. After the plate of glass has been formed, it is then annealed, and any irregularities or unevenness in the surface in which the wire-mesh is embedded is remedied by the heat of the annealing kiln.

Having thus described my invention, what I claim, and desire to secure by Letters Patent, is—

1. The herein-described process of wiring plate glass, which consists in preparing the wire-mesh previous to embedding it in the plate of glass, with a coating of fusible glass, and in embedding the wire-mesh so treated into the plate of glass, then subjecting the plate with its embedded wire-mesh to an annealing heat, substantially as described.

2. The herein-described process of wiring plate glass, which consists in first preparing the wire-mesh by coating it with a coat of fusible glass, embedding the mesh so treated into one face of the plate of glass during the process of rolling, then subjecting the plate with its embedded mesh to heat, substantially as described.

3. The process herein described of wiring plate glass, which consists in embedding into the plate during the process of rolling a wire-mesh which is coated with a fusible material, in smoothing the surface in which the mesh is introduced by mechanical means, and finally introducing the plate so prepared into an annealing kiln whereby the heat will act upon the coating of the mesh to make a smooth surface, and render said coating homogeneous with the plate of glass, substantially as described.

4. A plate of glass in which is embedded a wire-mesh said wire-mesh being surrounded or coated with a material whose coefficiency of expansion is about equal to that of the wire-mesh, said coating of the wire-mesh being fused into the plate of glass, substantially as described.

In testimony whereof I hereunto affix my signature, in presence of two witnesses, this 4th day of October, 1894.

EDWARD WALSH, Jr.

Witnesses:
F. R. CORNWALL,
HUGH K. WAGNER.